United States Patent [19]

Rom

[11] Patent Number: 5,450,616
[45] Date of Patent: Sep. 12, 1995

[54] METHOD AND APPARATUS FOR POWER CONTROL IN A WIRELESS LAN

[75] Inventor: Raphael Rom, Palo Alto, Calif.

[73] Assignee: Sun Microsystems, Inc., Mountain View, Calif.

[21] Appl. No.: 132,486

[22] Filed: Oct. 6, 1993

Related U.S. Application Data

[63] Continuation of Ser. No. 912,527, Jul. 13, 1992, abandoned.

[51] Int. Cl.⁶ .............................................. H04B 7/00
[52] U.S. Cl. ...................................... 455/69; 455/54.1; 455/88
[58] Field of Search ................. 455/67.1, 69, 88, 126, 455/127, 343, 226.1, 226.2, 115, 73, 54.1, 49.1, 63

[56] References Cited

U.S. PATENT DOCUMENTS

| | | | |
|---|---|---|---|
| 3,925,782 | 12/1975 | Anderl et al. | 455/69 |
| 4,495,648 | 1/1985 | Giger | 455/73 |
| 4,580,262 | 4/1986 | Naylor et al. | 455/69 |
| 4,613,990 | 9/1986 | Halpern | 455/54.1 |
| 4,777,653 | 11/1988 | Bonnerot et al. | 455/73 |
| 4,901,307 | 2/1990 | Gilhousen et al. | 370/18 |
| 4,991,184 | 2/1991 | Hashimoto | 455/69 |
| 5,001,776 | 3/1991 | Clark | 455/226.2 |
| 5,003,619 | 3/1991 | Morris et al. | 455/69 |
| 5,056,109 | 10/1991 | Gilhousen et al. | 455/69 |
| 5,125,105 | 6/1992 | Kennedy et al. | 455/226.2 |
| 5,204,970 | 4/1993 | Stengel et al. | 455/69 |

*Primary Examiner*—Edward F. Urban
*Assistant Examiner*—Nguyen Vo
*Attorney, Agent, or Firm*—Blakely Sokoloff Taylor & Zafman

[57] ABSTRACT

A method and apparatus for implementing a protocol for controlling transmitter power in a wireless LAN. The LAN is assumed to include a number of nodes, each node including a transmitter and a receiver for communicating information between computers located at the node. To initiate the protocol, the transmitter of a data sending node first transmits a signal including a transmitter power signal to each of the receivers of the data receiving noes. The information contained in the transmitter power signal may be transmitted in one of the fields of the data packet of the signal. The receivers of the data receiving nodes individually transmit power control feedback signals back to the transmitter of the data sending node. Information in each of the power control feedback signals may occupy a field in the data packet transmitted from the receiver to the transmitter of the data sending node. Preferably, the transmitter power signal indicates the radiated power level of the transmitter and each of the power control feedback signals comprises an instruction instructing the transmitter to adjust its radiated power. Upon receipt of these feedback signals, the transmitter preferably adjusts its radiated power accordingly, balancing the feedback received.

12 Claims, 4 Drawing Sheets

METHOD AND APPARATUS FOR POWER CONTROL IN A WIRELESS LAN

This is a continuation of application Ser. No. 07/912,527, filed Jul. 13, 1992, now abandoned.

BACKGROUND OF THE INVENTION

1. Field of the Invention

The present invention relates to the field of wireless local area networks (LANs) and, more particularly, to a method and apparatus for implementing a protocol for controlling transmitter power in wireless LANs.

2. Description of the Related Art

Through the merging of computer and communications technology, computer networks have greatly enhanced the computing power available to the individual computer user linked to other computers in a network. Not only do networks provide for the exchange of information between autonomous computers, but they also enable each user or "node" to share resources common to the entire network. Through resource sharing, all application programs, databases and physical equipment in the network may be made available to any node without regard to the physical location of the resource or the user.

As for the linkage between nodes, there are generally two types of network interconnections. The nodes in a wired network communicate with each other by using transmission lines to carry the signals between nodes. The nodes in a wireless network, on the other hand, communicate with each other using radio signals or other types of wireless links.

One type of wireless network is a wireless local area network (LAN). A LAN is local in the sense that the transceiver nodes are located within a radius of only a few miles of each other. As such, the proximity of the nodes permits the network to operate reliably at low power and at high data rates.

Typically most nodes are mobile and transmit information in packets. These mobile nodes can be configured around one or more stationary base stations, which coordinate the activity of the nodes in the network. Alternatively, the network can be set up in a free configuration, wherein the nodes communicate with each other without the need for any intermediary base stations to control network traffic. In other words, the number of nodes in a wireless LAN is typically variable and unknown to the individual nodes. A representative example of a wireless LAN is a network consisting of lap-top computer/transceiver units that are transported between offices and laboratories on a university campus.

Wireless LANs are to be contrasted with wide area networks (WANs). WANs operate over a much larger radius and accordingly require higher power transmitters. The greater distances also result in a higher error rate, thereby requiring that data be transmitted at a lower data rate, typically less than one million bits per second.

Another mobile communication system in common use is the cellular telephone network. Computer communications in cellular telephone systems cannot be accomplished optimally because the cellular telephone system is first and foremost a telephone system that is designed to optimally carry voice-encoded data, which has completely different characteristics than those of a general computer data interchange. Moreover, in the cellular telephone system, a telephone call ties up a dedicated bandwidth for the duration of the call, whereas a wireless LAN packet radio transmission occupies a channel only while data is being transmitted.

Because of the characteristics of the broadcast channels used in wireless networks, wireless communication between nodes suffers from a number of problems. First, in the common LAN many users may be transmitting simultaneously, resulting in interference at the receiver that may cause the entire message to be obliterated. A special case of interference is the near-far problem, common in spread spectrum systems, wherein between two equally powered transmitters, the transmitter closer to the receiver has a much higher likelihood of being received, thus preventing the farther signal from successfully reaching the target receiver.

Another problem with mobile telecommunications concerns the power consumed by the mobile units. A large percentage of the weight of a mobile computer terminal is taken up by a battery. Accordingly, to reduce battery weight and increase battery life, it is desirable to keep the transmitter power and the accompanying battery drain at a minimum.

These two problems are highlighted in the case of the transition (or "hand off") of a mobile transmitter from one base station to another in a multiple base station network. As the mobile unit moves away from one base station towards another, it is desirable that at some point communications between the first base station and the mobile unit cease and become picked up by the second base station being approached by the transmitter. By maintaining communications with only the most proximate base station, the mobile unit can minimize power consumption and induce less interference with other nodes in the network if the unit has the capability to adjust its power.

The foregoing problems can be alleviated by providing for a way to adjust the transmission power of the nodes in the LAN. To minimize power consumption and reduce interference, each transmitter should transmit with just enough power to reach the intended receiver and be reliably received. By using the minimum amount of power to achieve this objective, the transmitter avoids unnecessary interference with unintended receivers. Moreover, such power control permits for spatial reuse of the bandwidth at closer distances than would otherwise be possible.

Although power control is desirable, it is difficult to accomplish in practice. The power setting must be performed at the transmitter while the measurements are taken at the receiver. The receiver therefore must somehow provide feedback to manipulate the transmitter to transmit at optimal power.

One possible solution provides that the transmitter adjust its power based upon the quality of a signal from the receiver measured at the transmitter. This method fails, however, because radio links are asymmetric, meaning that channel characteristics are not the same in both directions. Thus, the transmitter cannot determine whether a receiver has satisfactorily received the transmitted signal based upon how well the transmitter receives a signal from the receiver.

Another potential solution is a configuration in which the receiver measures signal quality and provides feedback to the transmitter while it is transmitting, instructing the transmitter to increase or decrease transmitted power based upon the received signal quality. This relative power adjustment method is workable in a synchronous circuit switching environment, such as a cellular telephone system, characterized by the continuous transmission of a single conversation back and forth between nodes.

However, in an asynchronous data transmission environment, such as a packet switching local area network, a particular transmitter typically transmits relatively short packets or datagrams at high data rates intermittently in a noncontinuous manner, which makes it quite difficult to adjust the power while the transmission is ongoing. Thus, the receiver will have to adjust the transmitter's power using a separate (possibly even special) message or packet. The packets communicated between these nodes occasionally get lost in transmission and need to be retransmitted. Moreover, nodes in the network sometimes erroneously determine that a packet sent by the node has been lost, when in fact it has not. Thus, if a receiver operating on the basis of relative power adjustment mistakenly determines that the feedback signal was not received by the transmitter, then it will retransmit the feedback packet. As a result, the transmitter will have been erroneously instructed twice to increase or decrease radiated power, revealing a major drawback to the relative power adjustment method in an asynchronous data transmission environment.

It is also desirable to provide a power control system that can operate in a wireless LAN with an open communication protocol; that is, a protocol that can be used in a network comprising transceiver nodes of different makes, which may have varying capabilities in terms of transmission power setting and signal quality measurement. Some nodes may or may not be able to adjust the transmission power, measure the quality of the received signal, or execute an algorithm to translate signal quality measurements into power settings.

SUMMARY OF THE INVENTION

The present invention provides a method and apparatus for implementing a protocol for controlling transmitter power in a wireless LAN. The LAN is assumed to include a number of nodes, each node including a transmitter and a receiver for communicating information between the nodes. To initiate the protocol, the transmitter of a data sending node first transmits a first signal including a transmitter power signal to each of the receivers of the data receiving nodes. In various embodiments, the transmitter power signal contains information regarding the ability of the transmitter of the data sending node to adjust its power, or actually indicates the radiated power level of the transmitted signal. The information contained in the transmitter power signal preferably is transmitted in one of the fields of the data packet of the first signal.

The receivers of the data receiving nodes individually receive their copies of the first signal and, in response, transmit their power control feedback signals to the transmitter of the data sending node. Some of the power control feedback signals comprise instructions from the corresponding data receiving nodes instructing the transmitter of the data sending node to adjust its radiated power to certain power levels. Other feedback signals represent the inabilities of the receivers of the corresponding data receiving nodes to calculate proposed radiated power levels, or indicate merely the signal quality of the copies of the first signal measured at the receivers of the corresponding data receiving nodes. Note that the information in each of the power control feedback signals preferably occupies a field in the data packet transmitted from the receiver of the corresponding data receiving node to the transmitter of the data sending node.

Depending upon the capabilities of the receivers of the data receiving nodes and the transmitter of the data sending node, the transmitter of the data sending node may preferably adjust its radiated power based upon the power control feedback signals received from the data receiving nodes.

BRIEF DESCRIPTION OF THE DRAWINGS

The objects, features and advantages of the present invention will be apparent to one skilled in the art in light of the following detailed description in which.

DETAILED DESCRIPTION OF THE INVENTION

The present invention provides a method and apparatus for implementing a protocol for controlling transmitter power in a wireless LAN. The invention preferably may be used to ensure that the transmitter of a data sending node uses only enough power to reach the intended receivers of the data receiving nodes. This capability minimizes both the power consumption of the transmitters of data sending nodes and any interference with receivers of unintended data receiving nodes.

Figure 1A:
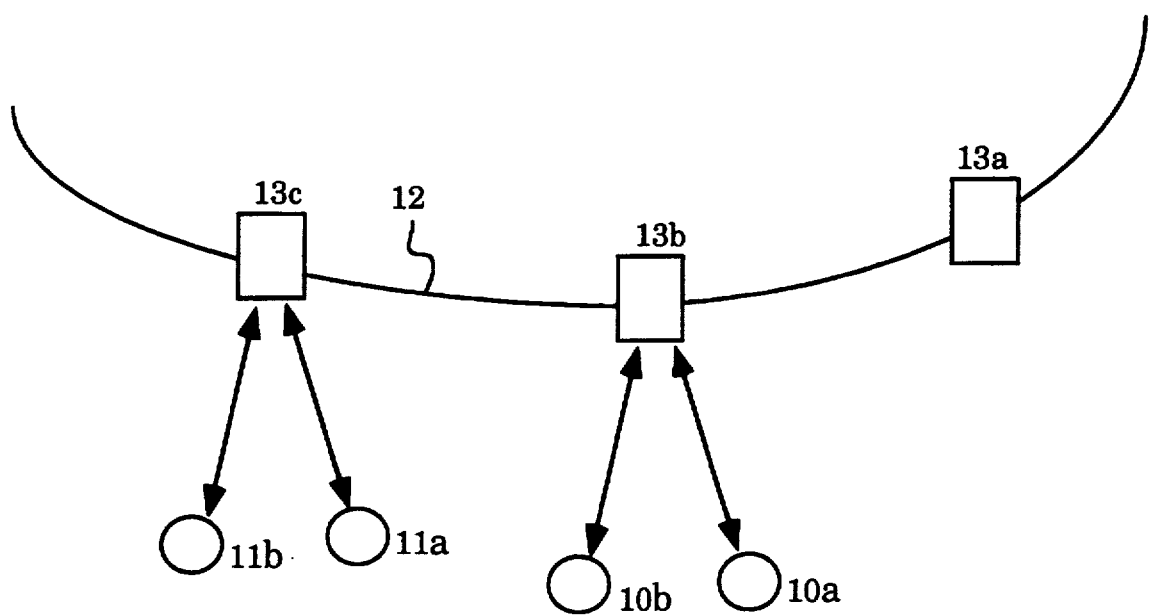
FIG. 1A illustrates a base station configuration of a wireless LAN.
Figure 1B:
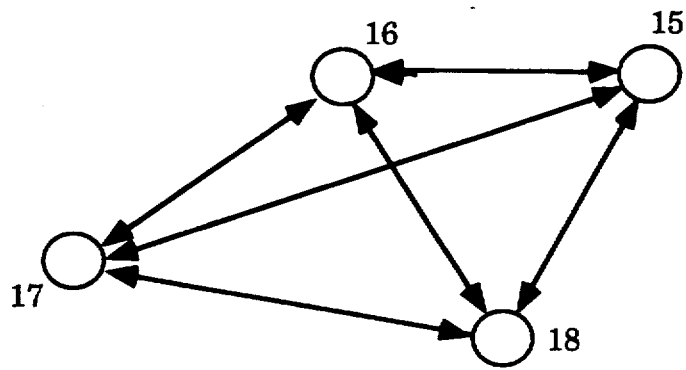
FIG. 1B illustrates a wireless LAN set up in a free configuration.

FIGS. 1A and 1B illustrate two configurations of wireless LANs. FIG. 1A illustrates a network whereby nodes 10a–10b and 11a–11b, for example, can communicate with each other via base stations or access points (APs). (The double-headed arrows represent communication paths.) FIG. 1A demonstrates how communications between nodes 10a and 11a are relayed to each other through the link 12 between AP 13b and AP 13c. The access points 13b and 13c may also be considered to be nodes in a network.

More than one node may be associated with a given AP. For example, both nodes 11a and 11b are served by AP 13c and may either communicate with each other directly (if they are within communicating distance) or through AP 13c, according to physical constraints, administrative constraints or the system design policy.

FIG. 1B illustrates a network set up in a free configuration, whereby the nodes 15–18 communicate with each other directly. Thus, a node may be a data sending node at one time and a data receiving receiving node at another time.

Figure 2:
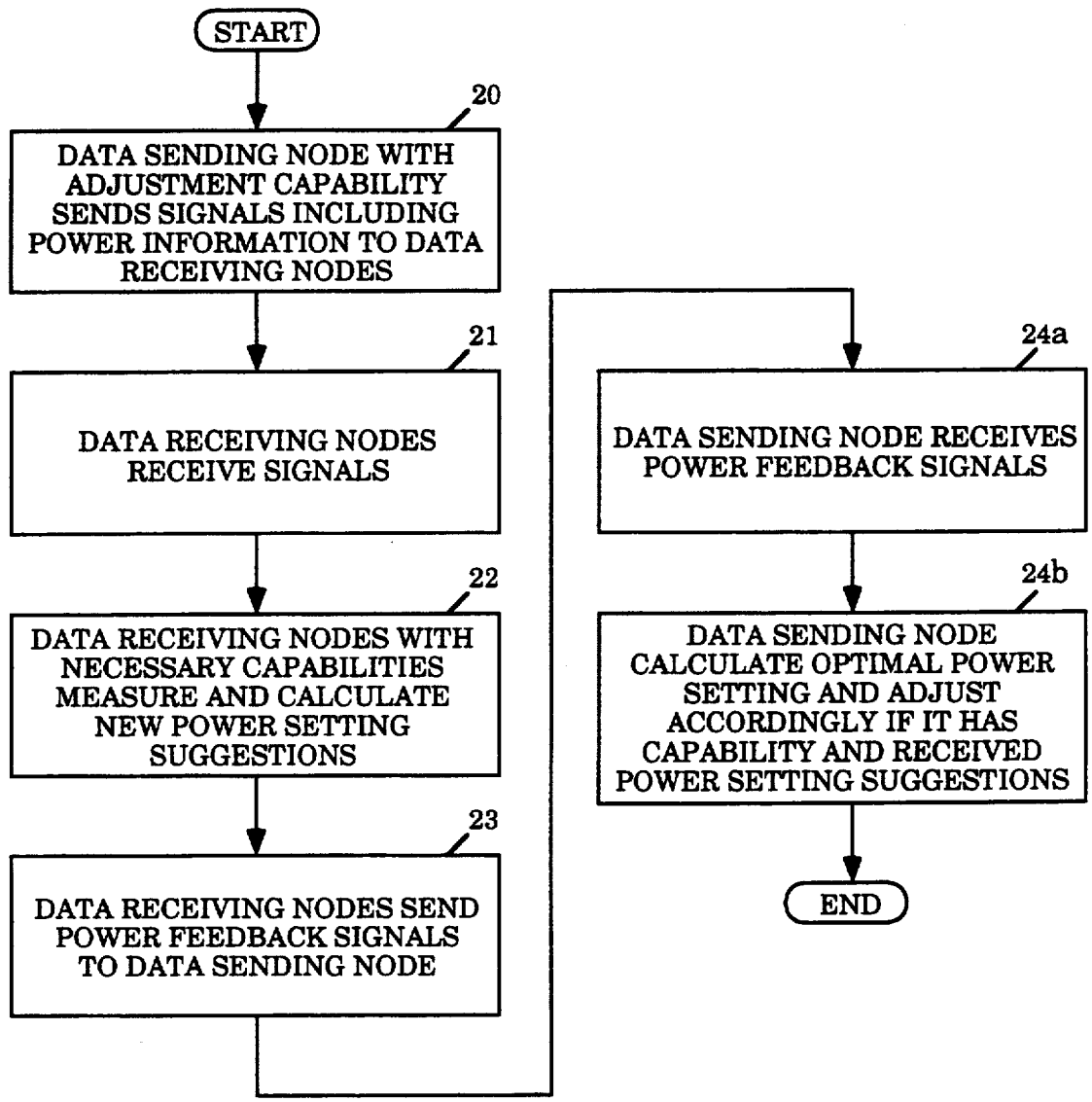
FIG. 2 is a flowchart of the method of the present invention.

FIG. 2 is a flow chart of an embodiment of the present invention. The invention overcomes problems inherent in conventional methods by preferably transmitting from a data sending node to a a number of data receiving nodes information concerning the radiated power of the signals transmitted from the data sending node, step 20. The data receiving nodes receive the signals individually, step 21. Additionally, the data receiving nodes measure the quality of the signals received from the data sending node, step 22. Based upon its measurement, each data receiving node preferably determines whether and to what extent the radiated power of the data sending node should be increased or decreased, step 22. Each data receiving node transmits a feedback signal to the the data sending node indicating a proposed radiated power, step 23. The data sending node receives the power setting suggestions, step 24a, and preferably calculates and adjusts its radiated power based upon the received power setting suggestions, step 24b.

Figure 3:
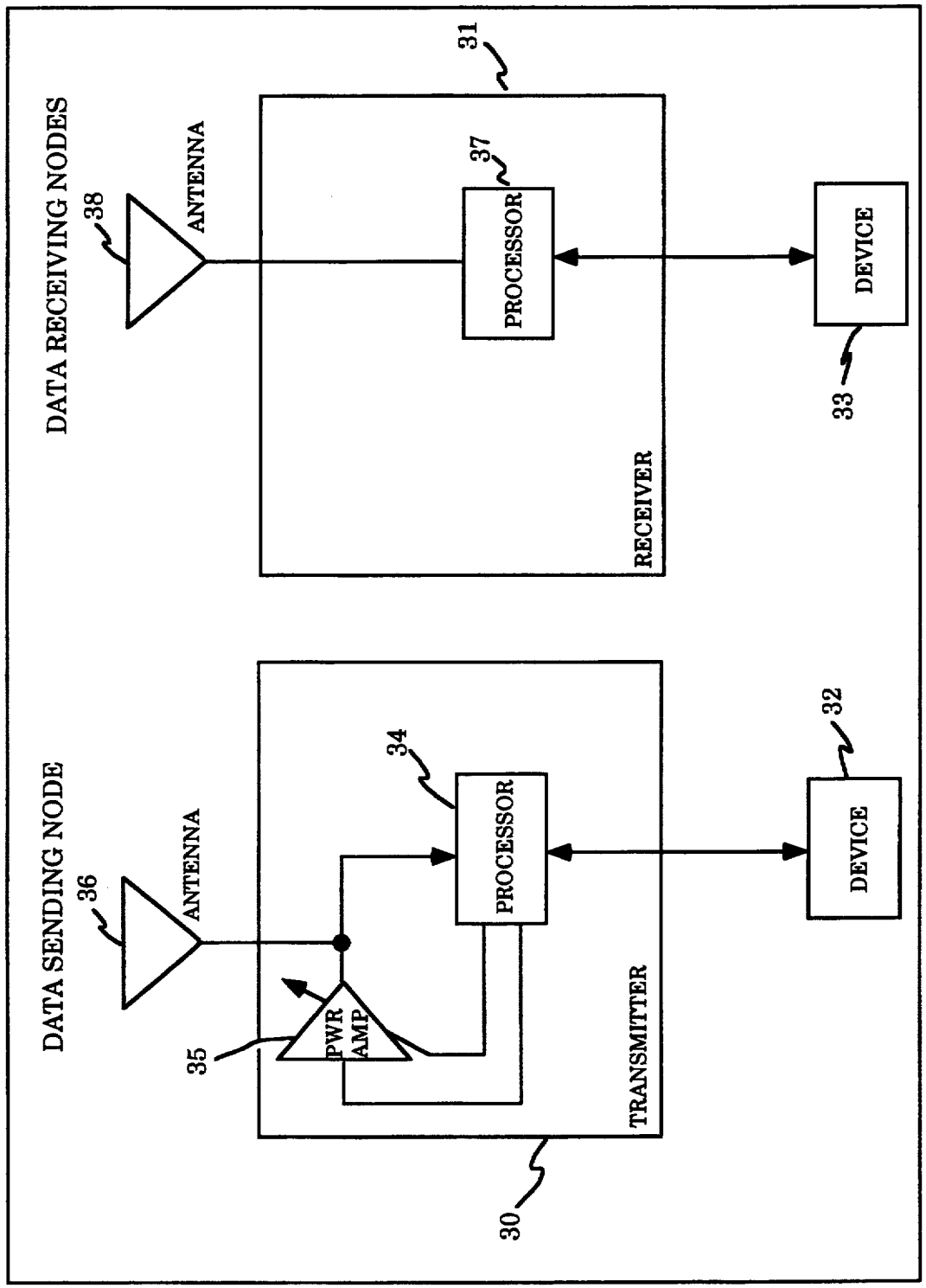
FIG. 3 is a simplified block diagram of an apparatus used to implement the present invention.

FIG. 3 is a simplified block diagram of the apparatus used to implement the present invention. Transmitter 30 represents the transmitter portion of a data sending node. Receiver 31 represents the receiver portions of the data receiving nodes in communication with transmitter 30 of the data sending node. Note that each node contains a transmitter and a receiver, which typically share common elements.

Information communicated from transmitter 30 of a data sending node to receivers 31 of the data receiver nodes includes data and control signals from device 32 of the data sending node, which are conveyed to devices 33 through receivers 31 of the data receiving nodes. Device 32 is in communication with transmitter processor 34, which in turn controls power amplifier 35 through which transmitter processor 34 transmits signals to antenna 36. Processor 34 also receives signals through antenna 36. Note that devices 32 and 33 each represents any apparatus that occupies a node, e.g., a computer, a peripheral device or any communications hardware.

Receivers 31 of the data receiving nodes include receiver processors 37 which are in communication with devices 33 of the data receiving nodes and which transmit and receive signals through antennas 38 of the data receiving nodes.

Figure 4:
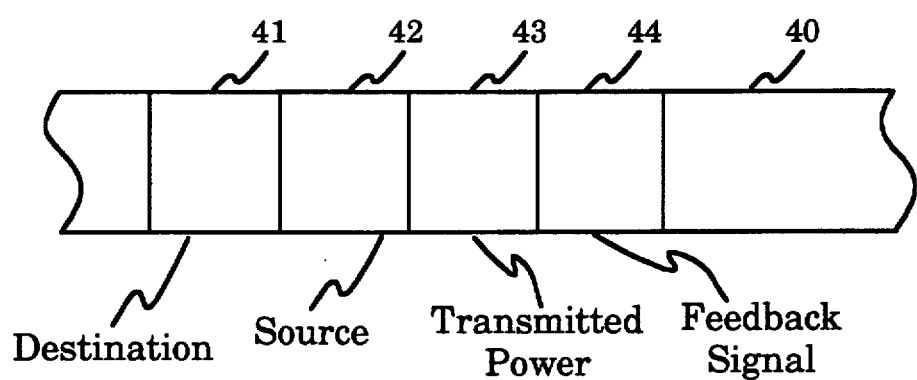
FIG. 4 illustrates a data packet used in implementing the present invention.

A shown in FIG. 4, the signals communicated between transmitter 30 of the data sending node and receivers 31 of the data receiving nodes are in the form of data packets 40. Each packet includes a field 41 identifying the node that is the destination of the packet, i.e. one of the data receiving nodes, and a field 42 identifying the source node, i.e. the data sending node.

To initiate the protocol of the present invention, transmitter 30 of the data sending node first transmits data packets formed by transmitter processor 34 of the data sending node to receivers 31 of the data receiving nodes. Each data packet includes a transmitter power signal that contains information concerning the radiated power of the transmitter of the data sending node. This power information preferably occupies a field 43 in the data packet 40.

In a preferred embodiment, the signal quality of the data packet transmissions received at antennas 38 are measured by receiver processors 37 of the data receiving nodes. Signal quality parameters may, for example, include signal power and error rate measurements. Based upon these parameters, the processors 37 of the data receiving nodes determine individually whether it is adequately receiving the transmission from transmitter 30 of the data sending node. If, for example, the error rate is above a predetermined threshold and/or the measured power level is below another predetermined threshold, the processor 37 of a particular data receiving node would determine that the radiated power of the transmitter of the data sending node should be increased. On the other hand, if the processor 37 of a particular data receiving node determines that the error rate is satisfactory and the power level is adequately high, then the processor 37 of the particular data receiving node may preferably decide that the radiated power of transmitter 30 of the data sending node should be decreased in order, for example, to reduce interference with neighboring receivers of other nodes.

In the preferred embodiment, the transmitter power signals received at receivers 31 of the data receiving nodes indicate the radiated power level of the transmitter 30 of the data sending node. This information is conveyed by the transmitter of the data sending node as part of the data packet. Because the receiver processors 37 of the data receiving nodes know the radiated power at which the received data packets were transmitted, the processors 37 of the data receiving nodes use this radiated power as a reference to propose new radiated power to the transmitter of the data sending node at which the transmitter of the data sending node should transmit subsequent data packets.

The receivers 31 of the data receiving nodes transmit power control feedback signals to the transmitter 30 of the data sending node. In the preferred embodiment, each feedback signal is set to a value representing the radiated power calculated by the receiver processor 37 of a particular data receiving node. As shown in FIG. 4, this signal preferably occupies a field 44 in data packet 40, which is transmitted back from the data receiving nodes to transmitter 30 of the data sending node as an acknowledgement or response to the packet received at receiver 31 of the particular data receiving node.

The transmitter processor 34 of the data sending node receives the data packet from the data receiving nodes containing the power control feedback signals. Based upon these power control feedback signals, the processor 34 of the data sending node preferably calculates and adjusts power amplifier 35 of the data sending node so that the radiated power of transmitter 30 of the data sending node based on the values suggested by the power control feedback signals.

For example, assume that a first node is to communicate data to a second and a third node. Referring to FIG 4, the first node would transmit two data packets, one each, to the second and third nodes, wherein field 41 of both data packets identifies the first node as the source node, and filed 42 of the two data packets represent the second and third nodes as destination nodes, respectively. If, for example, the first node were transmitting at a power of four milliwatts, this information would occupy field 43.

The second and third nodes would receive the data packet, calculate power control feedback signals and transmit packets back to the first node. In this case, field 41 of both packets would identify the second and third nodes as source nodes, and field 42 of both packets would now represent the first node as the destination node. Assuming that both the second and third nodes determined that the first node should increase transmitter power, the second node may, for example, send a power control feedback signal in field 44 instructing the first node to double its power to eight milliwatts, while the third node may, for example, send a power control feedback signal in field 44 instructing the first node to triple its power to twelve milliwatts. The first node can then calculate and adjust its power based on these suggestions, balancing the interest of the second and third nodes.

One advantage of the invention is that its operation is independent of the decision algorithm used at each node to determine the power level. Any type of algorithm can be used to determine the proposed radiated power level. The algorithm will be dependent upon the sophistication of the system. For example, a data receiving node may simply instruct the transmitter of the data sending node to increase or decrease its power to a percentage of the maximum radiated power which the transmitter of the data sending node is capable of radiating. Based upon the signal quality of the next packet received, the data receiving node may use the signal quality information that is gathered over time to suggest a new proposed radiated power level based upon an interpolation of the signal quality values.

In another embodiment of the invention, a data receiving node may not have the computing power necessary to calculate a proposed transmitter radiated power. In this case, the receiver processor 37 of the data receiving node may, for example, measure the received signal quality of the transmission from transmitter 30 of the data sending node, and set the power control feedback signal to a value indicating the received signal quality. Assuming that the transmitter 30 of the data sending node is provided with computing capability, the transmitter of the data sending node preferably decides how to adjust the radiated power based upon the received signal quality measurement contained in the power control feedback signal.

In still another embodiment, the transmitter 30 of the data sending node may not have the capability to adjust its radiated power. In that case, the transmitter processor 34 of the data sending node sets the transmitter power signal to a value, e.g., zero, indicating that the transmitter 30 of the data sending node cannot adjust its radiated power. Upon receipt of this signal at the receiver 31 of a data receiving node, the receiver processor 37 of the particular data receiving node will not expend any effort to calculate a proposed radiated power because the transmitter of the data sending node would not be able to adjust accordingly.

Similarly, in another embodiment, the receiver 31 of a particular data receiving node may not be able to measure signal quality. In this case, the processor 37 of the particular dat receiving node would set the power control feedback signal to a value indicating that the receiver of the particular data receiving node cannot measure the received signal quality. Upon receipt of this feedback signal at the transmitter 30 of the data sending node, the transmitter processor 34 of the data sending node would not take any steps to adjust the radiated power.

Because of the versatility of these embodiments, the present invention can achieve power control in a wireless LAN regardless of the power management capabilities of the nodes in the network.

Although the invention has been described in conjunction with the preferred embodiment, it will be appreciated that various modifications and alterations might be made by those skilled in the art without departing from the spirit and scope of the invention.

What is claimed is:

1. In a wireless Local Area Network (LAN) comprising n heterogeneous nodes sending frequent unscheduled short data packets to each other, where n is an integer greater than or equal to three, and not known to the individual nodes, a method for controlling transmission power employed by data packet sending nodes for transmitting data packets, said method comprising the steps of:

a) transmitting a first and a second unscheduled short data packet signal from a first data packet sending node to a first and a second data packet receiving nodes respectively, each of said first and second unscheduled shod data packet signals comprising a transmission power value indicating the transmission power currently employed by said first data packet sending node for transmitting data packets, said first data packet sending node being equipped to adjust the transmission power it employs for transmitting data packets;

b) receiving said first and second unscheduled short data packet signals at said first and second data packet receiving nodes respectively;

c) measuring said first and second unscheduled short data packet signals' signal quality as received at said first and second data packet receiving nodes, and calculating a first and a second power setting suggestions by said first and second data packet receiving nodes based on their individually received transmission power values and measured signal qualities, said first and second data packet receiving nodes being equipped to measure quality of signals they received and calculate power setting suggestions;

d) transmitting a first and a second unscheduled power control feedback signals comprising said calculated first and second power setting suggestions from said first and second data packet receiving nodes to said first data packet sending node;

e) receiving said first and second unscheduled power control feedback signals at said first data packet sending node; and f) adjusting the transmission power said first data packet sending node employs for transmitting data packets, based on said received first and second power setting suggestions, said first data packet sending node being equipped to determine adjustment to the transmission power it employs for transmitting data packets based on a number of power setting suggestions received.

2. The method as said forth in claim 1, wherein, said step a) further comprises transmitting a third unscheduled short data packet signal from said first data packet sending node to a third data packet receiving node, said third unscheduled short data packet signal also comprising said transmission power value;

said step b) further comprises receiving said third unscheduled short data packet signal at said third data packet receiving node;

said step d) further comprises transmitting a third unscheduled power control feedback signal from said third data packet receiving node to said first data packet sending node, said third unscheduled power control feedback signal comprising a power setting code indicating said third data packet receiving node being not equipped to measure quality of signals received at said third data packet receiving node nor calculate power setting suggestions;

said step e) further comprises receiving said third unscheduled power control feedback signal at said first data packet sending node; and said transmission power adjustment by said first data packet sending node in said step f) is further based on said received power setting code.

3. The method as said forth in claim 2, wherein, said method further comprises the steps of:

g) transmitting a fourth and a fifth unscheduled short data packet signal from a second data packet sending node to said first and second data packet receiving nodes respectively, each of said fourth and fifth unscheduled short data packet signals comprising a transmission power code indicating said second data packet sending node being not equipped to adjust the transmission power it employs for transmitting data packets; and h) receiving said fourth and fifth unscheduled short data packet signals at said first and second data packet receiving nodes respectively.

4. The method as said forth in claim 3, wherein, said method further comprises the steps:

said step g) further comprises transmitting a sixth unscheduled short data packet signal from said second data packet sending node to said third data packet receiving node, said sixth unscheduled short data packet signal also comprising said transmission power code;

said step h) further comprises receiving said sixth unscheduled short data packet signal at said third data packet receiving node.

5. In a wireless Local Area Network (LAN) comprising n heterogeneous nodes sending unscheduled short data packet to each other, where n is an integer greater than or equal to three, and not known to the individual nodes, an apparatus for controlling transmission power employed by data packet sending nodes for transmitting data packets, said apparatus comprising:

a) first transmission means embodied in a first data packet sending node for transmitting a first and a second unscheduled short data packet signal from said first data packet sending node to a first and a second data packet receiving nodes respectively, each of said first and second unscheduled short data packet signals comprising a transmission power value indicating the transmission power currently employed by said first transmission means of said first data packet sending node for transmitting data packets, said first data packet sending node being equipped to adjust the transmission power of said first transmission means;

b) first and second receiving means embodied in said first and second data packet receiving nodes respectively for receiving said first and second unscheduled short data packet signals at said first and second data packet receiving nodes;

c) first and second measure/calculate means embodied in said first and second data packet receiving nodes and correspondingly coupled to said first and second receiving means for measuring said first and second unscheduled short data packet signals' signal qualities as received at said first and second data packet receiving nodes, and calculating a first and a second power setting suggestions based on their individually received transmission power values and measured signal qualities;

d) second and third transmission means embodied in said first and second data packet receiving nodes and correspondingly coupled to said first and second measure/calculate means for transmitting a first and a second unscheduled power control feedback signals comprising said calculated first and second power setting suggestions from said first and second data packet receiving nodes to said first data packet sending node;

e) third receiving means embodied in said first data packet sending node for receiving said first and second unscheduled power control feedback signals at said first data packet sending node; and f) adjustment means embodied in said first data packet sending node and coupled to said first transmission means and said third receiving means for adjusting the transmission power said first transmission means employs for transmitting data packets, based on said received first and second power setting suggestions.

6. The apparatus as said forth in claim 5, wherein, said first transmission means further transmits a third unscheduled short data packet signal from said first data packet sending node to a third data packet receiving node, said third unscheduled short data packet signal also comprising said transmission power value;

said apparatus further comprises g) fourth receiving means embodied in said third data packet receiving node for receiving said third unscheduled short data pocket signal at said third data packet receiving node;

said apparatus further comprises h) fourth transmission means embodied in said third data packet receiving node and coupled to said fourth receiving means for transmitting a third unscheduled power control feedback signal from said third data packet receiving node to said first data packet sending node, said third unscheduled power control feedback signal comprising a power setting code indicating said third data packet receiving node being not equipped to measure quality of signals received at said third data packet receiving node nor calculate power setting suggestions;

said third receiving means further receives said third unscheduled power control feedback signal at said first data packet sending node; and said adjustment means further adjusts said transmission power of said first transmission means based on said received power setting code.

7. The apparatus as said forth in claim 6, wherein, said apparatus further comprises i) fifth transmission means embodied in a second data packet sending node for transmitting a fourth and a fifth unscheduled short data packet signal from said second data packet sending node to said first and second data packet receiving nodes respectively, each of said fourth and fifth unscheduled short data packet signals comprising a transmission power code indicating said second data packet sending node being not equipped to adjust the transmission power of its transmitter;

said first and second receiving means further receive said fourth and fifth unscheduled short data packet signals at said first and second data packet receiving nodes.

8. The apparatus as said forth in claim 7, wherein, said fifth transmission means further transmits a sixth unscheduled short data packet signal from said second data packet sending node to said third data packet receiving node, said sixth unscheduled short data packet signal also comprising said transmission power code;

said fourth receiving means further receiving said sixth unscheduled short data packet signal at said third data packet receiving node.

9. In a wireless Local Area Network (LAN) comprising n heterogeneous nodes sending frequent unscheduled short data packet to each other, where n is an integer greater than or equal to three, and not known to the individual nodes, an apparatus for controlling transmission power employed by data packet sending nodes for transmitting data packets, said apparatus comprising:

a) a first transmitter embodied in a first data packet sending node for transmitting a first and a second unscheduled short data packet signal from said first data packet sending node to a first and a second data packet receiving nodes respectively, each of said first and second unscheduled short data packet signals comprising a transmission power value indicating the transmission power currently employed by said first transmitter of said first data packet sending node for transmitting data packets, said first data packet sending node being equipped to adjust the transmission power of said first transmitter;

b) a first and a second receiver embodied in said first and second data packet receiving nodes respectively for receiving said first and second unscheduled short data packet signals at said first and second data packet receiving nodes;

c) a first and a second processor embodied in said first and second data packet receiving nodes and correspondingly coupled to said first and second receivers for measuring said first and second unscheduled short data packet signals' signal qualities as received at said first and second data packet receiving nodes, and calculating a first and a second power setting suggestions based on their individually received transmission power values and measured signal qualities;

d) a second and a third transmitter embodied in said first and second data packet receiving nodes and correspondingly coupled to said first and second processors for transmitting a first and a second unscheduled power control feedback signals comprising said calculated first and second power setting suggestions from said first and second data packet receiving nodes to said first data packet sending node;

e) a third receiver embodied in said first data packet sending node for receiving said first and second unscheduled power control feedback signals at said first data packet sending node; and f) a third processor embodied in said first data packet sending node and coupled to said first transmitter and third receiver for adjusting the transmission power said first transmitter employs for transmitting data packets, based on said received first and second power setting suggestions.

10. The apparatus as said forth in claim 9, wherein, said first transmitter further transmits a third unscheduled short data packet signal from said first data packet sending node to a third data packet receiving node, said third unscheduled short data packet signal also comprising said transmission power value;

said apparatus further comprises g) a fourth receiver embodied in said third data packet receiving node for receiving said third unscheduled short data packet signal at said third data packet receiving node;

said apparatus further comprises h) a fourth transmitter embodied in said third data packet receiving node and coupled to said fourth receiver for transmitting a third unscheduled power control feedback signal from said third data packet receiving node to said first data packet sending node, said third unscheduled power control feedback signal comprising a power setting code indicating said third data packet receiving node being not equipped to measure packet signals received at said third data packet receiving node nor calculate power setting suggestions;

said third receiver further receives said third unscheduled power control feedback signal at said first data packet sending node; and said third processor further adjusts said transmission power of said first transmitter based on said received power setting code.

11. The apparatus as said forth in claim 10, wherein, said apparatus further comprises i) a fifth transmitter embodied in a second data packet sending node for transmitting a fourth and a fifth unscheduled short data packet signal from said second data packet sending node to said first and second data packet receiving nodes respectively, each of said fourth and fifth unscheduled short data packet signals comprising a transmission power code indicating said second data packet sending node being not equipped to adjust the transmission power of its transmitter;

said first and second receivers further receive said fourth and fifth unscheduled short data packet signals at said first and second data packet receiving nodes.

12. The apparatus as said forth in claim 11, wherein, said fifth transmitter further transmits a sixth unscheduled short data packet signal from said second data packet sending node to said third data packet receiving node, said sixth unscheduled short data packet signal also comprising said transmission power code;

said fourth receiver further receiving said sixth unscheduled short data packet signal at said third data packet receiving node.

* * * * *

UNITED STATES PATENT AND TRADEMARK OFFICE
CERTIFICATE OF CORRECTION

PATENT NO. : 5,450,616
DATED : September 12, 1995
INVENTOR(S) : Raphael Rom It is certified that error appears in the above-identified patent and that said Letters Patent is hereby corrected as shown below:

In column 8 at line 5, please delete " shod " and insert -- short --.

In column 9 at line 26, please delete " packet " and insert -- packets --.

In column 12 at line 21, please delete " measure " and insert -- measure quality of --.

Signed and Sealed this

Tenth Day of December, 1996

Attest:

BRUCE LEHMAN

*Attesting Officer*    *Commissioner of Patents and Trademarks*